(12) United States Patent
Wnuk et al.

(10) Patent No.: US 8,202,422 B2
(45) Date of Patent: Jun. 19, 2012

(54) FLUID SYSTEM

(75) Inventors: Ralf Wnuk, Bexbach/Klölnottwollor (DE); Markus Olschok, Neunkirchen (DE); Jürgen Sauer, Neunkirchen (DE)

(73) Assignee: Hydac Process Technology GmbH, Neunkirchen (DE)

( * ) Notice: Subject to any disclaimer, the term of this patent is extended or adjusted under 35 U.S.C. 154(b) by 629 days.

(21) Appl. No.: 12/227,713

(22) PCT Filed: Apr. 13, 2007

(86) PCT No.: PCT/EP2007/003283
§ 371 (c)(1),
(2), (4) Date: Nov. 25, 2008

(87) PCT Pub. No.: WO2007/140840
PCT Pub. Date: Dec. 13, 2007

(65) Prior Publication Data
US 2009/0173222 A1 Jul. 9, 2009

(30) Foreign Application Priority Data
Jun. 3, 2006 (DE) .......................... 10 2006 026 077

(51) Int. Cl.
*B01D 33/00* (2006.01)
(52) U.S. Cl. .......... 210/324; 55/350.1; 55/482; 55/490; 55/493; 55/503; 210/330; 210/333.01; 210/359; 210/411; 210/418; 210/435; 210/497.1; 137/884

(58) Field of Classification Search .................... 210/90, 210/107, 108, 324, 328–330, 333.01, 333.1, 210/391, 393, 411, 424, 340, 341, 397.01, 210/134, 137, 167.01, 167.31, 258, 321.69, 210/416.1, 330.01, 397.1, 359, 418, 435, 210/443, 444, 497.01, 497.1, 499; 55/302, 55/342–344, 350.1, 419, 482–484, 490, 498, 55/502–505, 493; 137/315.01, 315.11, 563, 137/565.01, 861, 884
See application file for complete search history.

(56) References Cited

U.S. PATENT DOCUMENTS

| | | | | |
|---|---|---|---|---|
| 3,493,113 A | * | 2/1970 | Rosaen ......................... | 210/108 |
| 4,136,824 A | * | 1/1979 | Kallenbach .............. | 237/12.3 R |
| 4,334,992 A | * | 6/1982 | von Bonin et al. ............ | 210/241 |
| 4,486,304 A | * | 12/1984 | Neuman et al. ............... | 210/107 |
| 4,752,386 A | * | 6/1988 | Schulz et al. ................. | 210/108 |
| 4,973,406 A | * | 11/1990 | Ponzielli .................... | 210/333.1 |

(Continued)

FOREIGN PATENT DOCUMENTS
DE 23 21 312 A 11/1974
(Continued)

*Primary Examiner* — Joseph Drodge
(74) *Attorney, Agent, or Firm* — Roylance, Abrams, Berdo & Goodman L.L.P.

(57) ABSTRACT

A fluid system for a pump circuit (10), in particular a hydraulic high-pressure pump circuit, has a function block (12). In the housing of the function block, fluid-conducting paths extend and are connected to valve components (32, 46) at least partially. A filter device is an at least partially integrated constituent part of the function block of the fluid system. The filter device (46) with its filter housing (56) can be connected to the function block (12) such that at least one filter element (70) is received in the installation space (72) of the function block.

5 Claims, 3 Drawing Sheets

U.S. PATENT DOCUMENTS

| | | | |
|---|---|---|---|
| 5,128,035 A * | 7/1992 | Clack et al. | 210/251 |
| 5,200,077 A * | 4/1993 | McNeice et al. | 210/323.2 |
| 5,685,985 A * | 11/1997 | Brown et al. | 210/450 |
| 5,779,898 A * | 7/1998 | Schwanekamp et al. | 210/324 |
| 6,325,922 B1 * | 12/2001 | Schaller et al. | 210/90 |
| 2003/0127384 A1* | 7/2003 | Kapur | 210/235 |
| 2004/0074827 A1* | 4/2004 | Sann et al. | 210/132 |
| 2005/0184008 A1* | 8/2005 | Schacht et al. | 210/636 |
| 2008/0142419 A1* | 6/2008 | Slegers | 210/98 |

FOREIGN PATENT DOCUMENTS

| | | |
|---|---|---|
| DE | 30 34 090 A1 | 4/1981 |
| DE | 30 10 169 A1 | 9/1981 |
| DE | 32 27 926 C4 | 2/1984 |
| DE | 33 40 382 A1 | 5/1984 |
| DE | 197 34 588 A1 | 2/1999 |
| DE | 199 34 574 A1 | 2/2001 |
| WO | WO 01/89659 A1 | 11/2001 |
| WO | WO 2005/072845 A1 | 8/2005 |

\* cited by examiner

FLUID SYSTEM

FIELD OF THE INVENTION

The invention relates to a fluid system for a pump circuit, in particular a hydraulic high pressure pump circuit, having a function block. Fluid-carrying paths extend in a housing of the function block and are connected to valve components at least partially connected.

BACKGROUND OF THE INVENTION

DE 199 34 574 C2 discloses a generic fluid system, with flow paths for gases and/or liquids, and with prismatic function units and structural units. As fluid-carrying paths, the units have flow channels and, in the face surfaces, have connection openings for adjacent function units and structural units. In addition, a mounting plate can be provided for the attachment of the function units and structural units. These units have a base surface formed of a square with a standard edge length or of several such squares. To build a modular building-block system of the block-like function units and structural units as well as the valve components, the units on their base surfaces and the mounting plate have holes in a corresponding grid for definable fastening possibilities. The structural units in the respective fastening position adjoin one another with their side surfaces. The connection openings in the respective valve block as a unit is enclosed by ring-shaped depressions receiving at least one gasket each adjoining the wall of the depression and sealing it.

With the known fluid system, a type of modular system is devised capable of performing a plurality of fluidic tasks. To trigger the fluid-carrying paths, valve components are used, such as directional valves, pressure limitation valves, throttle valves, etc. Sensors and other display devices such as, for example, pressure gauges or the like can also be connected.

If the prior art function block is to interact with other fluid components, for example, hydraulic pumps, coolers, heat exchangers, filter units, etc., these additional components can be connected to the prior art function block separately via additional piping. This additional piping leads to structurally large designs and, due to the relatively long fluid transport paths, to thermally inconsistent behavior that can adversely affect the efficiency of these fluid systems.

SUMMARY OF THE INVENTION

An object of the invention is to provide an improved fluid system such that, in connection with the use of filter elements as additional fluid components, less installation space is necessary and improved efficiency is obtained especially when the most varied operating temperature ranges occur.

This object is basically achieved by a fluid system where a filter device with its filter housing can be connected to the function block such that at least one filter element is held in the installation space of the function block. The filter device is at least a partially integrated component of the function block of the fluid system. This arrangement results in a fluid system of structurally small size, in which its individual components are compactly combined with the valve components in the region of the function block. Since the function block can omit additional piping for connection of the filter element, in terms of thermal operating conditions, a balanced operating situation for the fluid system according to the invention is achieved. The relatively thickly made wall parts of the function block can also contribute to this achievement. Since possible diversion paths for the fluid are shortened, efficiency for the fluid system according to the invention is also improved in this respect.

In one especially preferred embodiment of the fluid system according to the invention, the filter device is intended for the use of several filter elements through which flow can take place for filtration or backflushing in both directions. Some filter elements undertake filtration in one filtration position, and at least one other filter element can be backflushed for cleaning its active filter surface in a backflushing position. In this way automatic operation for the fluid system is possible. By automatic monitoring of fouling, a backflushing process can be carried out using a pivoting device with a motor to pivot the respective filter elements in succession into their filter position or backflushing position.

The fluid system according to the invention with its essential components, a function block with valve components and an inserted filter device, has proven especially effective in use in high pressure pump circuits. In these circuits, a high pressure pump is coupled to the fluid outlet of the fluid system. The fluid system then ensures that only highly cleaned fluid is available for further transport to the high pressure pump to ensure a smooth pumping process for the hydraulic circuit. Otherwise, even extremely small dirt particles can be enough, particularly for specially configured high pressure pumps, to endanger their operation.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
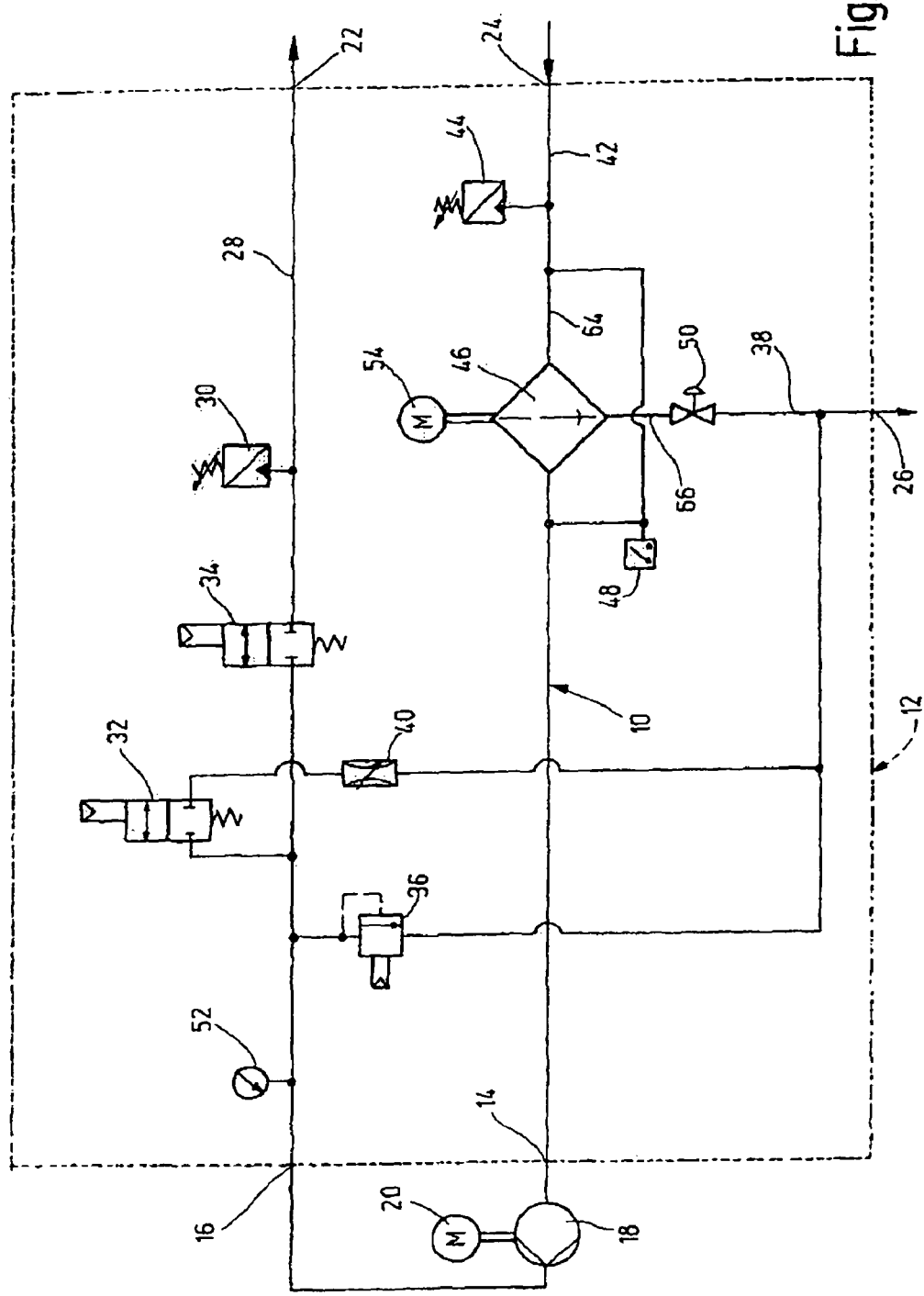
FIG. 1 is a hydraulic circuit diagram using the fluid system according to an exemplary embodiment of the invention for a hydraulic high pressure pump circuit.

FIG. 1 shows a fluid system according to an exemplary embodiment of the invention for a pump circuit 10, in particular in the form of a hydraulic high pressure pump circuit. This pump circuit 10 has a function block 12 symbolized in the hydraulic circuit diagram shown in FIG. 1 with a dot-dash frame. The function block 12 has connection sites in the form of one pump inlet 14 and one pump outlet 16. The high pressure pump 18 is connected to the connection sites, has a drive motor 20 and is made as an intake pump. The function block 12 has one fluid outlet 22 connected to a machine tool requiring a hydraulic medium (not detailed). The machine tool in turn is connected with its fluid outlet to the fluid inlet 24 of the function block 12. A drain connection 26 can lead, for example, to a chip conveyor (not detailed) of the machine tool. This application is only exemplary. Instead of the machine tool, other hydraulic consumers, for example, hydraulic transmissions, hydraulically triggerable hoists, hydraulic motors of a fork lift and the like can be connected to the function block. Instead of the high pressure pump 18, a low pressure pump or the function block 12 can be connected to the hydraulic circuit in another relation, for example, in a hydraulic heat exchanger circuit or hydraulic cooling circuit.

In the illustrated case, in the fluid-carrying path 28 to the machine tool, in addition to the high pressure switch 30, are two high pressure 2/2-way valves 32, 34. On the input side of the directional valve 32 for safety reasons a pressure limitation valve 36 is provided whose output discharges into the backflushing line 38. On its output side, the 2/2-way valve 32 is connected via an adjustable throttle valve 40 to the backflush line 38 so that largely unpressurized circulation or flow via the throttle valve 40 for the fluid is possible. Another fluid-carrying path 42 is a corresponding fluid line leading from the fluid inlet 24 of the machine tool to the pump inlet 14 of the function block 12. Adjacent to the fluid inlet 24 in turn a pressure switch 44 is connected to the path 42, in this instance as a low pressure switch. Downstream in the direction of the inlet 14 a filter device 46 follows. The degree of filter device fouling can be detected by an electrical differential pressure switch 48 positioned in the bypass line of the path 42 to the filter device 46. If in one preferred embodiment the filter device 46 is designed as a backflushing filter device, as in this case, the backflushing line 38 is connected to the filter device 46 and can be blocked by the backflushing valve 50. System values of the fluid circuit, such as, for example, the fluid pressure, can be retrieved by sensors, such as, for example, a pressure gauge 52.

Supply of the machine tool with fluid can be set via the 2/2-way valves 32, 34. In the illustrated blocked state of the valves 32, 34, the high pressure pump 18 by way of the throttle valve 40 returns the quantity of fluid to the drain connection 26 of the function block 12. In this way the high pressure pump 18 can be made as a constant pump with a permanent pump capacity. For the corresponding demand for the machine tool (not detailed), the directional valves 32, 34 are opened at discrete, definable time intervals. In this way it is possible to constantly ensure filtration operation, in which fluid coming from the fluid inlet 24 is filtered by the filter device 46 and conveyed by the pump 18 and discharged into the hydraulic circuit by the drain connection 26 from the function block 12. If the filter device 46 is made as a backflushing filter, the backflushing process can be manually triggered. Preferably automatic backflushing operation is envisaged, using a pivoting device for the individual filter elements. The pivoting device can be triggered by a motor 54 as detailed below. The filter device 46 in the simplest case of dismounting could have only a single filter element which in the fouled state could be replaced by a new filter element.

Figure 2:
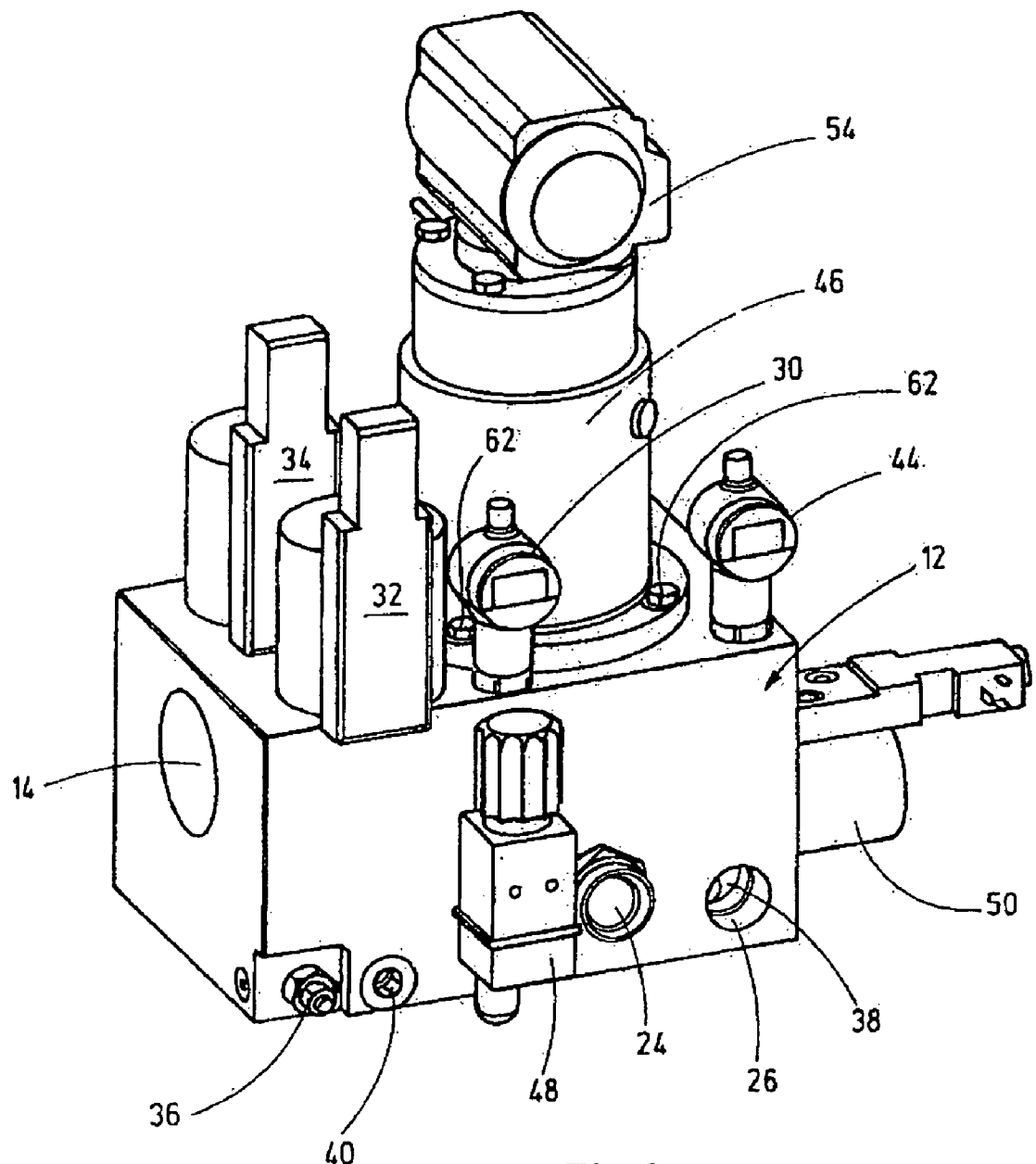
FIG. 2 is a perspective plan view the fluid system of FIG. 1 without the high pressure pump connected.

FIG. 2 shows the function block 12 in a perspective side view with the components specified in FIG. 1 reproduced in their configuration in FIG. 2. As FIG. 2 shows, the entire function block 12 with the integrated filter device 46 is structurally small in the form of a cuboid. All components of the pump circuit 10 as shown in FIG. 1 can be integrated in a space-saving manner into the function block 12.

Preferably, within the housing of the function block 12, the fluid-carrying paths, in particular the paths 28 and 42 with their secondary branch lines, are internally connected to one another such that a type of matrix structure of transverse and longitudinal rows of fluid-carrying lines is formed. Placeholders are integrated in the function block 12 for installation of the respective valve components. This place-holder solution, in addition to the matrix-like connecting structure of the respective connecting lines, permits management of a plurality of system tasks. Depending on the desired function, other valve components can also be set on the place-holders. A basic system once in use can also be easily modified on site in the manner of a hydraulic module. Other valve components can replace the valve components used previously. In particular, when large amounts of fluid and fluid pressures arise, the system can be adapted on site. Valve components for the place-holders can be not only conventional pilot and directional valves, but also pressure limitation valves, nonreturn valves and other triggerable pilot valves. The function block 12 built can also be integrated into other hydraulic function systems, for example, into the tank unit of a mobile hydraulic systems (not detailed).

Figure 3:
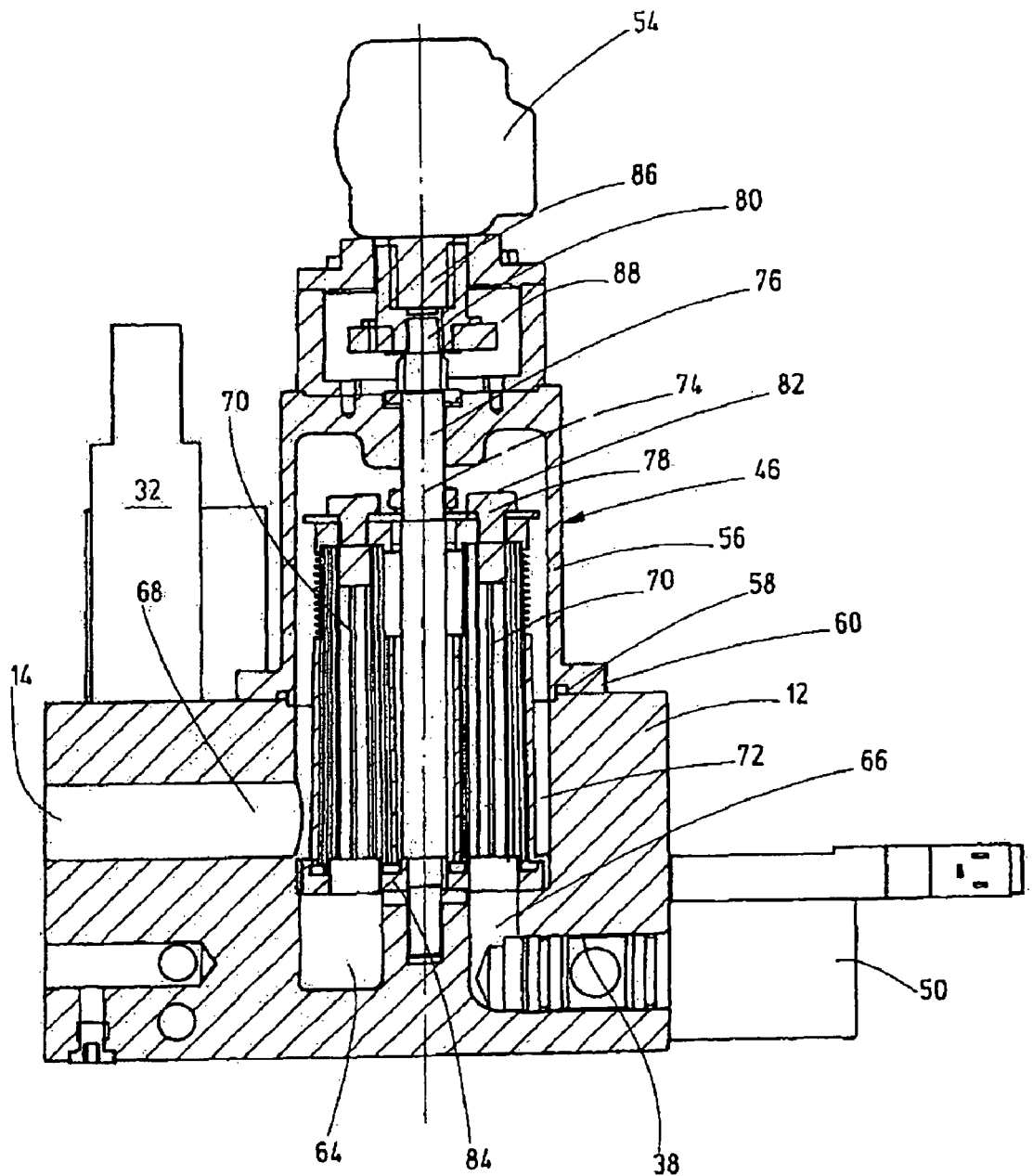
FIG. 3 is a side elevational view in section of the fluid system of FIG. 2.

The filter device 46 shown in FIG. 3 is designed as a backflushing filter device and has a cylindrical housing part 56 as the filter housing. This filter housing part 56 as viewed in FIG. 3 is seated on the top of the function block 12 and engages the corresponding housing part of the function block 12 by a staggered projection 58. The housing part 56 widens to the outside by the flange piece 60. The underside of flange piece 60 has a receiving channel for a ring seal (not detailed) for sealing the interior of the housing part 56 relative to the exterior. In this way the housing part 56 is detachably connected to the housing of the function block 12 via the corresponding connecting screws 62 (FIG. 2). For fluid supply of the filter device 46 the housing of the function block 12 has one fluid channel 64 leading to the fluid input 24. Another fluid channel 66 discharges into the backflushing line 38 with a backflushing valve 50 and is made as a screw-in cartridge as shown in FIG. 2 inserted into the function block 12. The left half of the FIG. 3 shows the pump inlet 14 of the function block 12 discharging by the fluid connection 68 into the interior of the function block 12 and into the interior of the housing part 56 of the filter device 46.

Filter elements 70 taper conically toward the top and are inserted into the filter device 46. Instead of conical filter elements 70, at least partially cylindrical filter elements (not shown) can be used. The conical filter elements 70 are preferably slotted hole screen filter elements arranged at distances from one another along a cylindrical arc within the filter housing part 56 and within the housing part of the function block 12. For holding the individual filter elements 70, the function block 12 is provided with a cup-shaped recess 72 whose boundary wall ends flush with the inside wall of the filter housing part 56.

The arrangement as shown in FIG. 3 with the filter elements 70 is chosen to be able to undertake backflushing. For function blocks of simple structure, only a single filter element can be integrated in the function block 12 such that viewed in its axial length it is more or less one half held in the function block 12, in particular in the cup-like recess or installation space 72. The other half projects from the underside into the interior of the housing part 56. The filter device 46 can then be partially integrated in a very compact manner with its function elements in the function block 12. The filter elements 70 are also protected against mechanical damage by the wall parts of the function block 12. Since the function block 12 in the region of the receiver of the filter elements 70 is provided with a relatively great wall thickness, reliable chambering of the active filter elements 70 is achieved in thermal terms. This arrangement results in a reduction in the loss of performance during filtration, especially if the medium to be filtered should be very different in terms of the temperature of use.

In the selected arrangement as shown in FIG. 3, in addition to the two illustrated filter elements 70, at radially equal distances to the illustrated two filter elements 70, another pair of filter elements 70 project out of the plane of the figure and lie in the plane of the figure which lies behind. Altogether therefore there are four filter elements 70 located diametrically to one another to the longitudinal axis 74 of the filter device 46 and arranged in pairs opposite one another to the longitudinal axis 74. Other configurations are conceivable here. As viewed in FIG. 3 the right-hand filter element 70 is located over fluid channel 66 and is backflushed by the filtrate found in the housing part 5. In doing so, the filtrate from the outside to the inside penetrates the filter element 70 to be backflushed. Dirt removed by the backflushing travels via the other fluid channel 66 and the backflushing valve 50 which is then opened to the drain connection 26 of the function block 12. Then the fouled backflush quantity can be delivered to the chip conveyor of a machine tool (not detailed).

The other three filter elements 70 are connected annularly with their respective underside to the fluid channel 64 via which the unfiltered material originating from the machine tool via the fluid input 24 is supplied to the filter device 46. Filtration takes place via the individual filter elements 70 from the inside to the outside. The filtrate travels via the fluid connection 68 to the high pressure pump 18 (not detailed), as shown in FIG. 1. Since this high pressure pump 18 can implement very high intake capacities, according to the invention care must be taken that the fluid connection 68 discharges in the lower base region of the conical filter elements 70 so that it can offer a corresponding resistance to a strong fluid flow. In the region of the widened base support for the individual filter elements 70 effective filtration takes place to an especially high degree. This arrangement benefits the operation of the fluid system in terms of the overall energy balance.

By a pivoting device 76 the individual filter element 70 can move in succession from their filtration position into the backflushing position and again into the filtration position. Peripheral motion for the individual filter elements 70 can take place both clockwise and counterclockwise. The pivoting device 76 has a receiving part 78 for end-side accommodation of the individual filter elements 70. The receiving part 78 is pivoted or rotated by the motor 54 within the filter housing 56 around the pivoting axis 80. This pivoting axis 80 is essentially congruent with the longitudinal axis 74 of the filter device 46.

The receiving part 78 has two opposite end parts 82, 84, between which the individual filter elements 70 extend. The lower end part 84 has passages for fluid transport. The upper end part 82 is sealed fluid-tight to the exterior, that is, into the interior of the housing part 56. If the housing part 56 is removed from the function block 12, via the upper end part 82 the filter elements 70 can also be lifted out of the function block 12 for replacement by new elements.

The motor 54 of the filter device 46 can be an electric motor, but preferably is a pneumatic motor. This pneumatic motor is characterized in that its cog-like driven part, depending on the pump motion of the piston parts of the pneumatic motor, executes alternating back and forth motion. This back and forth motion then can be converted by a free-wheeling device 88 into a constant drive motion in one drive direction for the pivoting axle 80 of the filter device 46. These free-wheeling devices for pneumatic motors are conventional so that they are not described in detail. With the indicated drive concept, the alternating back and forth motion of the pneumatic motor 54 can be converted into pivoting motion by 90° at a time for the filter elements 70. The pivoting device 76 can then always clean one filter element 70 in the backflushing position in succession and maintain conventional filtration operation with the other three filter elements. The backflushing process for a filter element 70 can take place at more or less continuous time intervals. It is also possible by difference pressure measurements, for example, by means of an electrical differential pressure switch 48, to determine on the respective filter elements 70 themselves when they are ready to be backflushed.

As a result of the conical structure of the individual filter elements 70, including the configuration of the cavity for the housing part 56, this arrangement has proven especially favorable in terms of energy in filtration operation, since the resistance offered in flow through the filter elements 70 in conventional filtration operation, formed by the resistance of the parts of the housing 56, is distinctly reduced in this way. Based on this configuration essentially laminar flow behavior occurs. This flow helps reduce outflow resistance in conventional filtration operation and ensures that the filtered amount can be removed at the fluid connection 68 to the high pressure pump 18.

The already indicated slotted hole screen filter elements preferably used, in the direction of the longitudinal axis 74 of the filter device have tilted support rods around which a wire section is wound in individual turns, leaving gaps through which fluid can pass. A weld spot is in the region of each contact point of the wire section with the support rod. The gap size provided for free fluid passage, that is, the distance between two gaps, prevents passage of dirt if the particle size exceeds this gap width. Dirt settled in the gaps can be reliably removed from the filter device by the described backflushing operation. The filter element 70 cleaned in this way then moves from the backflushing position back into the filtration position and can be directly used there for further filtration operation.

For stable support of the filter elements 70, a configuration is also used in which the pivoting axle 80 on the end side is guided both in the function block 12 and in the region of the upper wall parts of the filter housing 56 of the filter device 46. The vibrations occurring at the pneumatic motor 54 can be reliably diverted into the base structure of the function block 12 both via the housing part 56 and via the pivoting axle 80. This diversion helps reduce the damaging portion of the vibration. The tightly packed coaxial arrangement of filter elements 70, relative to the pivoting axle 80, also ensures reliably operation in which the filter elements 70 as a whole are moved into the illustrated backflushing position.

While one embodiment has been chosen to illustrate the invention, it will be understood by those skilled in the art that various changes and modifications can be made therein without departing from the scope of the invention as defined in the appended claims.

What is claimed is:

1. A fluid system for a pump circuit with a pump, comprising:
   a function block having a housing and an installation space therein;
   fluid-carrying paths extending in said housing of said function block and being internally inter-connected with one another forming a matrix of transverse and longitudinal rows of fluid-carrying lines;
   valve components at least partially connected to said fluid-carrying paths in placeholders integrated in said function block; and
   a filter device having a filter housing connected to said function block and having a filter element at least partially in said installation space, said filter device including several movable filter elements through which fluid can flow in filtration and backwashing directions with some of the filter elements being able to filter fluid in filtration positions and at least one of the filters being able to be backwashed for cleaning an active surface thereof in a backwashing position;

a pivoting device coupled to said function block and moving said filter elements to and from said filtration positions and said backwashing position; and said pivoting device having a receiving part holding said filter elements and being pivotable within said filter housing about a pivoting axle by a drive.

2. A fluid system according to claim 1 wherein
said drive has a free wheeling device acting on said pivoting axle of said pivoting device, said filter elements being arranged coaxially about said pivoting axle, said pivoting device being a guide for rotation on an end side in said filter housing and in said function block.

3. A fluid system according to claim 2 wherein
said drive has a drive housing; and
said free wheeling device has a free wheeling housing, said drive housing being seated on said free wheeling housing, said free wheeling housing being seated on said filter housing.

4. A fluid system for a pump circuit with a pump, comprising:
a function block having a housing and an installation space therein;
fluid-carrying paths extending in said housing of said function block and being internally inter-connected with one another forming a matrix of transverse and longitudinal rows of fluid-carrying lines;
valve components at least partially connected to said fluid-carrying paths in placeholders integrated in said function block; and
a filter device having a filter housing connected to said function block and having a filter element at least partially in said installation space, said filter housing of said filter device being sealed on said function block and receiving approximately a top half of an installation length of said filter element.

5. A fluid system for a pump circuit with a pump, comprising:
a function block having a housing and an installation space therein;
fluid-carrying paths extending in said housing of said function block and being internally inter-connected with one another forming a matrix of transverse and longitudinal rows of fluid-carrying lines;
valve components at least partially connected to said fluid-carrying paths in placeholders integrated in said function block; and
a filter device having a filter housing connected to said function block and having a filter element at least partially in said installation space, said filter element being a conical slotted hole screen filter element.

* * * * *